(12) United States Patent
Heap

(10) Patent No.: US 6,912,616 B2
(45) Date of Patent: Jun. 28, 2005

(54) MAPPING ADDRESSES TO MEMORY BANKS BASED ON AT LEAST ONE MATHEMATICAL RELATIONSHIP

(75) Inventor: Mark A. Heap, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 296 days.

(21) Appl. No.: 10/292,144

(22) Filed: Nov. 12, 2002

(65) Prior Publication Data

US 2004/0093457 A1 May 13, 2004

(51) Int. Cl.$^7$ ............................................. G06F 12/06
(52) U.S. Cl. ........................ 711/5; 711/219; 711/220; 365/230.03
(58) Field of Search ........................... 711/5, 219, 220; 365/230.03

(56) References Cited

U.S. PATENT DOCUMENTS 5,134,695 A  *  7/1992  Ikeda ............................. 711/5
6,070,227 A     5/2000  Rokicki
6,405,286 B2    6/2002  Gupta et al.
2004/0064666 A1 *  4/2004  Bickerstaff ................... 711/200

OTHER PUBLICATIONS

Patterson, David. A and John L. Hennessy, "Computer Architecture A Quantitative Approach", 2nd Edition. Chapter 5 Memory Hierarchy Design, pp. 435–437 (1996).
Gao, Q.S. "The Chinese Remainder Theorem and the Prime Memory System," IEEE (1993) pp. 337–340.

* cited by examiner

Primary Examiner—Jack A. Lane (57) ABSTRACT

One embodiment of the invention is a memory controller that maps a received address to a memory location in a plurality of memory banks, the memory controller comprising: circuitry for calculating a remainder from a division of the received address by a divisor, wherein the divisor is based on the number of the plurality of banks; circuitry for determining a particular bank of the plurality of banks based on the remainder and at least one bit of the received address; and circuitry for determining the memory location in the particular bank using at least a portion of the received address.

25 Claims, 10 Drawing Sheets

FIG. 4A $$\begin{array}{cccc} \underline{\text{BANK 0}} & \underline{\text{BANK 1}} & \underline{\text{BANK 2}} & \underline{\text{BANK 3}} \\ b=0 \ (00) & b=1 \ (01) & b=2 \ (00) & b=0 \ (11) \\ b=0 \ (01) & b=1 \ (10) & b=2 \ (01) & b=1 \ (00) \\ b=0 \ (10) & b=1 \ (11) & b=2 \ (10) & b=2 \ (11) \end{array}$$

$b = X \text{ MOD } 3$
NUMBER BANKS $= 2^N = 4$
$X = X_m ... X_0$
$(X_a, X_b) \Sigma X$ RULES:
  IF $b=0$ AND $(X_a, X_b) = (1,1)$ THEN BANK = BANK 3
  IF $b=1$ AND $(X_a, X_b) = (0,0)$ THEN BANK = BANK 3
  IF $b=2$ AND $(X_a, X_b) = (1,1)$ THEN BANK = BANK 3
  ELSE BANK = BANK b

FIG. 4C

| BANK ADDRESS | BANK 0 | BANK 1 | BANK 2 | BANK 3 |
|---|---|---|---|---|
| 0 | 0 | 1 | 2 | 3 |
| 1 | 6 | 7 | 5 | 4 |
| 2 | 9 | 10 | 8 | 11 |
| 3 | 12 | 13 | 14 | 15 |
| 4 | 18 | 19 | 17 | 16 |
| 5 | 21 | 22 | 20 | 23 |
| 6 | 24 | 25 | 26 | 27 |
| 7 | 30 | 31 | 29 | 28 |

FIG. 4B

| ADDRESS | BINARY ADDRESS $X_4X_3X_2X_1X_0$ | MOD | BANK | BANK ADDRESS $X_4X_3X_2$ |
|---|---|---|---|---|
| 0 | 00000 | 0 | 0 | 0 |
| 1 | 00001 | 1 | 1 | 0 |
| 2 | 00010 | 2 | 2 | 0 |
| 3 | 00011 | 0 | 3 | 0 |
| 4 | 00100 | 1 | 3 | 1 |
| 5 | 00101 | 2 | 2 | 1 |
| 6 | 00110 | 0 | 0 | 1 |
| 7 | 00111 | 1 | 1 | 1 |
| 8 | 01000 | 2 | 2 | 2 |
| 9 | 01001 | 0 | 0 | 2 |
| 10 | 01010 | 1 | 1 | 2 |
| 11 | 01011 | 2 | 3 | 2 |
| 12 | 01100 | 0 | 0 | 3 |
| 13 | 01101 | 1 | 1 | 3 |
| 14 | 01110 | 2 | 2 | 3 |
| 15 | 01111 | 0 | 3 | 3 |
| 16 | 10000 | 1 | 3 | 4 |
| 17 | 10001 | 2 | 2 | 4 |
| 18 | 10010 | 0 | 0 | 4 |
| 19 | 10011 | 1 | 1 | 4 |
| 20 | 10100 | 2 | 2 | 5 |
| 21 | 10101 | 0 | 0 | 5 |
| 22 | 10110 | 1 | 1 | 5 |
| 23 | 10111 | 2 | 3 | 5 |
| 24 | 11000 | 0 | 0 | 6 |
| 25 | 11001 | 1 | 1 | 6 |
| 26 | 11010 | 2 | 2 | 6 |
| 27 | 11011 | 0 | 3 | 6 |
| 28 | 11100 | 1 | 3 | 7 |
| 29 | 11101 | 2 | 2 | 7 |
| 30 | 11110 | 0 | 0 | 7 |
| 31 | 11111 | 1 | 1 | 7 |

FIG. 5A

BANK 0     BANK 1     BANK 2     BANK 3
b=0 (00)   b=1 (00)   b=2 (00)   b=0 (11)
b=0 (01)   b=1 (01)   b=2 (01)   b=1 (11)
b=0 (10)   b=1 (10)   b=2 (10)   b=2 (11)

$b = X \bmod 3$

NUMBER BANKS $= 2^N = 4$ $X = X_m \ldots X_0$ $(X_a, X_b) \Sigma X$

RULES:
  IF b=0,1,2 AND $(X_a, X_b) = (1,1)$ THEN BANK = BANK 3
  ELSE BANK = BANK b

FIG. 5C

| BANK ADDRESS | BANK 0 | BANK 1 | BANK 2 | BANK 3 |
|---|---|---|---|---|
| 0 | 0 | 1 | 2 | 3 |
| 1 | 6 | 4 | 5 | 7 |
| 2 | 9 | 10 | 8 | 11 |
| 3 | 12 | 13 | 14 | 15 |
| 4 | 18 | 16 | 17 | 19 |
| 5 | 21 | 22 | 20 | 23 |
| 6 | 24 | 25 | 26 | 27 |
| 7 | 30 | 28 | 29 | 31 |

FIG. 5B

| ADDRESS | BINARY ADDRESS $X_4X_3X_2X_1X_0$ | MOD | BANK | BANK ADDRESS $X_4X_3X_2$ |
|---|---|---|---|---|
| 0 | 00000 | 0 | 0 | 0 |
| 1 | 00001 | 1 | 1 | 0 |
| 2 | 00010 | 2 | 2 | 0 |
| 3 | 00011 | 0 | 3 | 0 |
| 4 | 00100 | 1 | 1 | 1 |
| 5 | 00101 | 2 | 2 | 1 |
| 6 | 00110 | 0 | 0 | 1 |
| 7 | 00111 | 1 | 3 | 1 |
| 8 | 01000 | 2 | 2 | 2 |
| 9 | 01001 | 0 | 0 | 2 |
| 10 | 01010 | 1 | 1 | 2 |
| 11 | 01011 | 2 | 3 | 2 |
| 12 | 01100 | 0 | 0 | 3 |
| 13 | 01101 | 1 | 1 | 3 |
| 14 | 01110 | 2 | 2 | 3 |
| 15 | 01111 | 0 | 3 | 3 |
| 16 | 10000 | 1 | 1 | 4 |
| 17 | 10001 | 2 | 2 | 4 |
| 18 | 10010 | 0 | 0 | 4 |
| 19 | 10011 | 1 | 3 | 4 |
| 20 | 10100 | 2 | 2 | 5 |
| 21 | 10101 | 0 | 0 | 5 |
| 22 | 10110 | 1 | 1 | 5 |
| 23 | 10111 | 2 | 3 | 5 |
| 24 | 11000 | 0 | 0 | 6 |
| 25 | 11001 | 1 | 1 | 6 |
| 26 | 11010 | 2 | 2 | 6 |
| 27 | 11011 | 0 | 3 | 6 |
| 28 | 11100 | 1 | 1 | 7 |
| 29 | 11101 | 2 | 2 | 7 |
| 30 | 11110 | 0 | 0 | 7 |
| 31 | 11111 | 1 | 3 | 7 |

FIG. 6

| BANK 0 | BANK 1 | BANK 2 | BANK 3 |
|---|---|---|---|
| b=0 (000) | b=1 (001) | b=2 (000) | b=3 (001) |
| b=0 (001) | b=1 (010) | b=2 (001) | b=3 (010) |
| b=0 (010) | b=1 (011) | b=2 (010) | b=3 (011) |
| b=0 (011) | b=1 (100) | b=2 (011) | b=3 (100) |
| b=0 (100) | b=1 (101) | b=2 (100) | b=3 (101) |
| b=0 (101) | b=1 (110) | b=2 (101) | b=3 (110) |
| b=0 (110) | b=1 (111) | b=2 (110) | b=3 (111) |

| BANK 4 | BANK 5 | BANK 6 | BANK 7 |
|---|---|---|---|
| b=4 (000) | b=5 (001) | b=6 (000) | b=0 (111) |
| b=4 (001) | b=5 (010) | b=6 (001) | b=1 (000) |
| b=4 (010) | b=5 (011) | b=6 (010) | b=2 (111) |
| b=4 (011) | b=5 (100) | b=6 (011) | b=3 (000) |
| b=4 (100) | b=5 (101) | b=6 (100) | b=4 (111) |
| b=4 (101) | b=5 (110) | b=6 (101) | b=5 (000) |
| b=4 (110) | b=5 (111) | b=6 (110) | b=6 (111) |

$b = X \bmod 7$
NUMBER BANKS $= 2^N = 8$
$X = X_m \ldots X_0$
$(X_a, X_b, X_c) \Sigma X$ RULES:
  IF b=0, 2, 4, OR 6 AND $(X_a, X_b, X_c)$ = (111) THEN BANK = BANK 7
  IF b=1, 3, OR 5 AND $(X_a X_b X_c)$ = (000) THEN BANK = BANK 7
  ELSE BANK = BANK b

$b = X \bmod 15$
NUMBER BANKS $= 2^N = 16$
$X = X_m \ldots X_0$
$(X_a, X_b, X_c, X_d) \Sigma X$

RULES:

IF $b=0, \ldots$ OR 15
AND $(X_a, X_b, X_c, X_d) = 1111$
THEN BANK = BANK 15
ELSE BANK = BANK b

| BANK 0 | BANK 1 | BANK 2 | BANK 3 | BANK 4 | BANK 5 | BANK 6 | BANK 7 |
|---|---|---|---|---|---|---|---|
| b=0 0000 | b=1 0000 | b=2 0000 | b=3 0000 | b=4 0000 | b=5 0000 | b=6 0000 | b=7 0000 |
| b=0 0001 | b=1 0001 | b=2 0001 | b=3 0001 | b=4 0001 | b=5 0001 | b=6 0001 | b=7 0001 |
| b=0 0010 | b=1 0010 | b=2 0010 | b=3 0010 | b=4 0010 | b=5 0010 | b=6 0010 | b=7 0010 |
| b=0 0011 | b=1 0011 | b=2 0011 | b=3 0011 | b=4 0011 | b=5 0011 | b=6 0011 | b=7 0011 |
| b=0 0100 | b=1 0100 | b=2 0100 | b=3 0100 | b=4 0100 | b=5 0100 | b=6 0100 | b=7 0100 |
| b=0 0101 | b=1 0101 | b=2 0101 | b=3 0101 | b=4 0101 | b=5 0101 | b=6 0101 | b=7 0101 |
| b=0 0110 | b=1 0110 | b=2 0110 | b=3 0110 | b=4 0110 | b=5 0110 | b=6 0110 | b=7 0110 |
| b=0 0111 | b=1 0111 | b=2 0111 | b=3 0111 | b=4 0111 | b=5 0111 | b=6 0111 | b=7 0111 |
| b=0 1000 | b=1 1000 | b=2 1000 | b=3 1000 | b=4 1000 | b=5 1000 | b=6 1000 | b=7 1000 |
| b=0 1001 | b=1 1001 | b=2 1001 | b=3 1001 | b=4 1001 | b=5 1001 | b=6 1001 | b=7 1001 |
| b=0 1010 | b=1 1010 | b=2 1010 | b=3 1010 | b=4 1010 | b=5 1010 | b=6 1010 | b=7 1010 |
| b=0 1011 | b=1 1011 | b=2 1011 | b=3 1011 | b=4 1011 | b=5 1011 | b=6 1011 | b=7 1011 |
| b=0 1100 | b=1 1100 | b=2 1100 | b=3 1100 | b=4 1100 | b=5 1100 | b=6 1100 | b=7 1100 |
| b=0 1101 | b=1 1101 | b=2 1101 | b=3 1101 | b=4 1101 | b=5 1101 | b=6 1101 | b=7 1101 |
| b=0 1110 | b=1 1110 | b=2 1110 | b=3 1110 | b=4 1110 | b=5 1110 | b=6 1110 | b=7 1110 |

| BANK 8 | BANK 9 | BANK 10 | BANK 11 | BANK 12 | BANK 13 | BANK 14 | BANK 15 |
|---|---|---|---|---|---|---|---|
| b=8 0000 | b=9 0000 | b=10 0000 | b=11 0000 | b=12 0000 | b=13 0000 | b=14 0000 | b=0 1111 |
| b=8 0001 | b=9 0001 | b=10 0001 | b=11 0001 | b=12 0001 | b=13 0001 | b=14 0001 | b=1 1111 |
| b=8 0010 | b=9 0010 | b=10 0010 | b=11 0010 | b=12 0010 | b=13 0010 | b=14 0010 | b=2 1111 |
| b=8 0011 | b=9 0011 | b=10 0011 | b=11 0011 | b=12 0011 | b=13 0011 | b=14 0011 | b=3 1111 |
| b=8 0100 | b=9 0100 | b=10 0100 | b=11 0100 | b=12 0100 | b=13 0100 | b=14 0100 | b=4 1111 |
| b=8 0101 | b=9 0101 | b=10 0101 | b=11 0101 | b=12 0101 | b=13 0101 | b=14 0101 | b=5 1111 |
| b=8 0110 | b=9 0110 | b=10 0110 | b=11 0110 | b=12 0110 | b=13 0110 | b=14 0110 | b=6 1111 |
| b=8 0111 | b=9 0111 | b=10 0111 | b=11 0111 | b=12 0111 | b=13 0111 | b=14 0111 | b=7 1111 |
| b=8 1000 | b=9 1000 | b=10 1000 | b=11 1000 | b=12 1000 | b=13 1000 | b=14 1000 | b=8 1111 |
| b=8 1001 | b=9 1001 | b=10 1001 | b=11 1001 | b=12 1001 | b=13 1001 | b=14 1001 | b=9 1111 |
| b=8 1010 | b=9 1010 | b=10 1010 | b=11 1010 | b=12 1010 | b=13 1010 | b=14 1010 | b=10 1111 |
| b=8 1011 | b=9 1011 | b=10 1011 | b=11 1011 | b=12 1011 | b=13 1011 | b=14 1011 | b=11 1111 |
| b=8 1100 | b=9 1100 | b=10 1100 | b=11 1100 | b=12 1100 | b=13 1100 | b=14 1100 | b=12 1111 |
| b=8 1101 | b=9 1101 | b=10 1101 | b=11 1101 | b=12 1101 | b=13 1101 | b=14 1101 | b=13 1111 |
| b=8 1110 | b=9 1110 | b=10 1110 | b=11 1110 | b=12 1110 | b=13 1110 | b=14 1110 | b=14 1111 |

| BANK 0 | BANK 1 | BANK 2 | BANK 3 | BANK 4 | BANK 5 | BANK 6 | BANK 7 |
|---|---|---|---|---|---|---|---|
| b=0 0 0\|000 | b=0 1\|000 | b=1 0\|000 | b=1 1\|000 | b=2 0\|000 | b=2 1\|000 | b=3 0\|000 | b=3 1\|000 |
| b=0 0 0\|001 | b=0 1\|001 | b=1 0\|001 | b=1 1\|001 | b=2 0\|001 | b=2 1\|001 | b=3 0\|001 | b=3 1\|001 |
| b=0 0 0\|010 | b=0 1\|010 | b=1 0\|010 | b=1 1\|010 | b=2 0\|010 | b=2 1\|010 | b=3 0\|010 | b=3 1\|010 |
| b=0 0 0\|011 | b=0 1\|011 | b=1 0\|011 | b=1 1\|011 | b=2 0\|011 | b=2 1\|011 | b=3 0\|011 | b=3 1\|011 |
| b=0 0 0\|100 | b=0 1\|100 | b=1 0\|100 | b=1 1\|100 | b=2 0\|100 | b=2 1\|100 | b=3 0\|100 | b=3 1\|100 |
| b=0 0 0\|101 | b=0 1\|101 | b=1 0\|101 | b=1 1\|101 | b=2 0\|101 | b=2 1\|101 | b=3 0\|101 | b=3 1\|101 |
| b=0 0 0\|110 | b=0 1\|110 | b=1 0\|110 | b=1 1\|110 | b=2 0\|110 | b=2 1\|110 | b=3 0\|110 | b=3 1\|110 |

↙ 801

| BANK 8 | BANK 9 | BANK 10 | BANK 11 | BANK 12 | BANK 13 | BANK 14 | BANK 15 |
|---|---|---|---|---|---|---|---|
| b=4 0\|000 | b=4 1\|000 | b=5 0\|000 | b=5 1\|000 | b=6 0\|000 | b=6 1\|000 | b=0 0\|111 | b=0 1\|111 |
| b=4 0\|001 | b=4 1\|001 | b=5 0\|001 | b=5 1\|001 | b=6 0\|001 | b=6 1\|001 | b=1 0\|111 | b=1 1\|111 |
| b=4 0\|010 | b=4 1\|010 | b=5 0\|010 | b=5 1\|010 | b=6 0\|010 | b=6 1\|010 | b=2 0\|111 | b=2 1\|111 |
| b=4 0\|011 | b=4 1\|011 | b=5 0\|011 | b=5 1\|011 | b=6 0\|011 | b=6 1\|011 | b=3 0\|111 | b=3 1\|111 |
| b=4 0\|100 | b=4 1\|100 | b=5 0\|100 | b=5 1\|100 | b=6 0\|100 | b=6 1\|100 | b=4 0\|111 | b=4 1\|111 |
| b=4 0\|101 | b=4 1\|101 | b=5 0\|101 | b=5 1\|101 | b=6 0\|101 | b=6 1\|101 | b=5 0\|111 | b=5 1\|111 |
| b=4 0\|110 | b=4 1\|110 | b=5 0\|110 | b=5 1\|110 | b=6 0\|110 | b=6 1\|110 | b=6 0\|111 | b=6 1\|111 |

MAPPING ADDRESSES TO MEMORY BANKS BASED ON AT LEAST ONE MATHEMATICAL RELATIONSHIP

FIELD OF THE INVENTION

Embodiments of the invention relate in general to computer memory, and in specific to a system and method for mapping addresses to memory banks that reduces conflicts and increases bandwidth.

DESCRIPTION OF THE RELATED ART

Figure 1A:
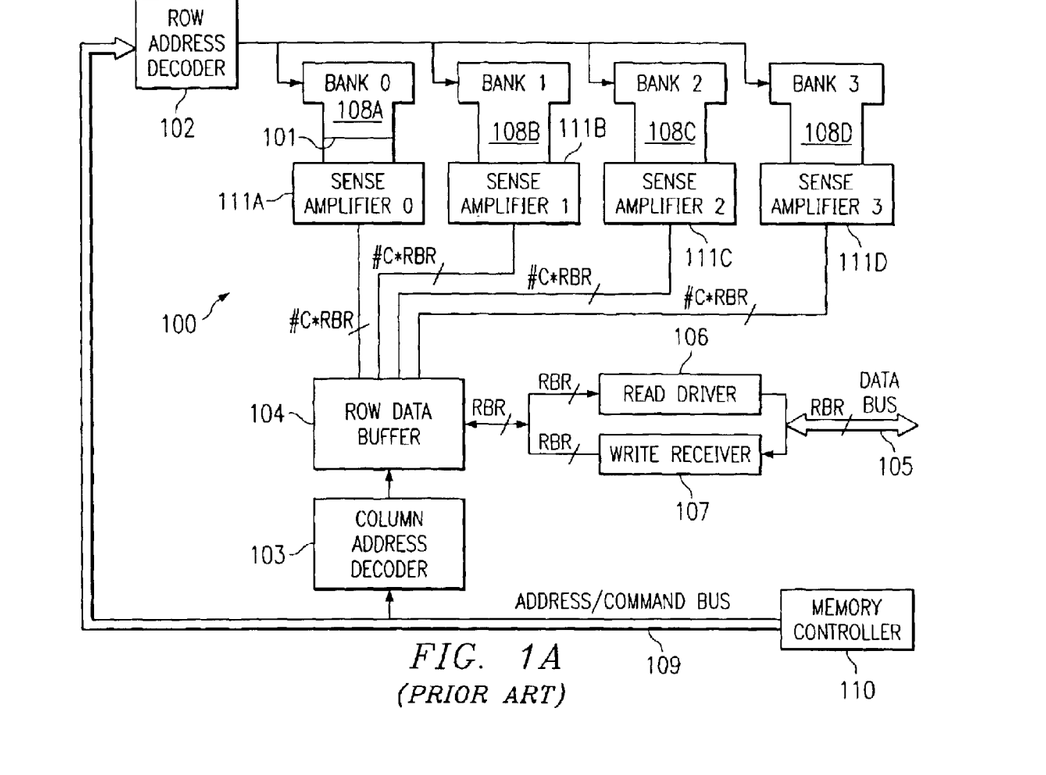
FIGS. 1A–1B depict a prior art arrangement of a SDRAM.

A synchronous dynamic random access (SDRAM) memory or a double data rate memory (DDR) typically comprises multiple banks. For example, as shown in FIG. 1A, memory 100 comprises 4 banks, 108A, 108B, 108C, and 108D. Each bank is arranged into rows and columns. Each bank has its respective sense amplifier 111A, 111B, 111C, and 111D. When data is to be read from or written to the memory, a particular row 101 in a particular bank (e.g. 108A) of memory, is activated with a row and bank address from controller 110, which is decoded by row address decoder 102. The desired row is loaded into the row data buffer 104. After the particular row is active, the column address decoder 103 uses the address from the controller 110 to select a column of the activated row in the row data buffer 104. Data moving into or out-of the particular column/row address location is handled by data bus 105, read driver 106, and write receiver 107. Address/Command bus 109 is used by the controller 110 to send addresses and commands to the row address decoder 102 and the column address decoder 103. Note that the line width is the number of columns (#c) times the burst length of the transaction ($R_{BR}$), where the burst length is the number of consecutive columns accessed starting from an initial column address.

The memory 100 may be programmed to handle burst memory transactions, which allows multiple data locations to be simultaneously accessed (i.e. read from or written to) within a single bank. For the memory of FIG. 1A, assuming a burst length of 4, 1 column address is interpreted as 4 sequential addresses, thus allowing 4 columns to be accessed sequentially with only 1 column address. The memory locations that correspond to each column/row location are coupled to the data bus. Thus, for each row activation, a total of four memory locations can be accessed.

One problem with this arrangement is that there is only one row of sense amplifiers per memory bank. Consequently, after a particular row of a memory bank has a memory location that has been accessed, that row needs to be closed or pre-charged to allow access to a different row in the same bank. Thus, while pre-charging is taking place, other rows within the memory bank cannot be accessed. The minimum time between activates to different rows in the same bank is known as row address strobe (RAS) cycle time or $t_{RC}$.

For maximum system performance, the data bus needs to be kept as busy as possible, otherwise it is likely that the CPU may be idle while waiting for data from memory. One way to maximize data bus usage is to interleave consecutive memory accesses to different banks. Thus, after accessing one particular bank, other banks would ideally be accessed until $t_{RC}$ has passed, wherein the one particular bank could then be accessed again. Note that the bandwidth is the number of clock cycles that data is transferred on the bus, divided by the total number of clock cycles. So if data is transferred all the time, the bandwidth is 100%. If data is transferred three out of four cycles, bandwidth is 75%. So maximizing the bandwidth, means maximizing the use of the data bus.

Figure 1B:
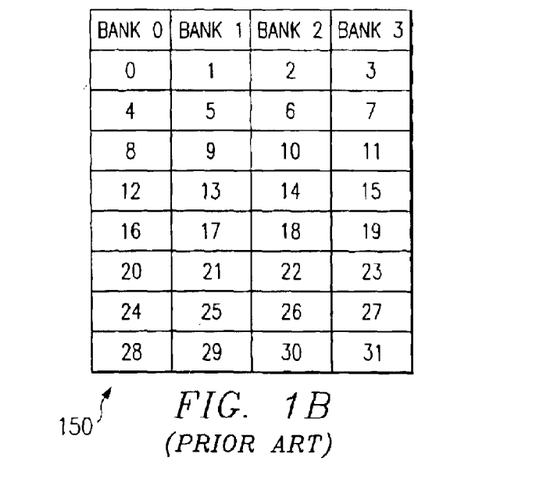

FIG. 1B depicts an example 150 of a prior art address mapping to the 4 bank memory of FIG. 1A. This example assumes, for the sake of simplicity, that the 4 banks comprise a total of 32 address locations. In this manner, consecutively addressed transactions, that is addresses with stride 1, will be mapped to different banks. This is referred to a least significant bit (LSB) interleaving, because the least significant bits determine the bank address. For example, in binary notation the 2 least significant bits of 16, 17, 18, and 19 are 00, 01, 10, and 11 respectively, and so these addresses are mapped to banks 0, 1, 2, and 3, respectively. Note that addresses higher than 0 to 31 would map to wrap around locations, for example address 32 would map a location 0, address 33 would map a location 1, etc.

Figure 2A:
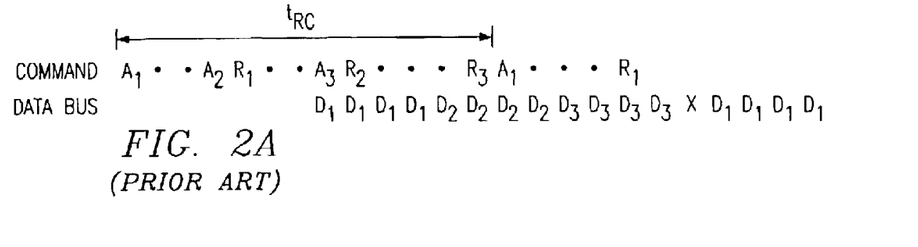
FIGS. 2A–2C are a series of timing diagrams depicting the effects of interleaving on the data bus.
Figure 2B:
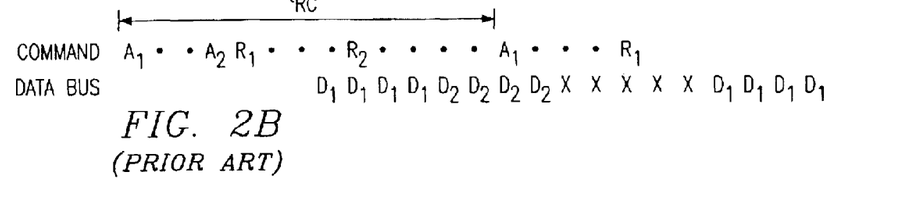
Figure 2C:
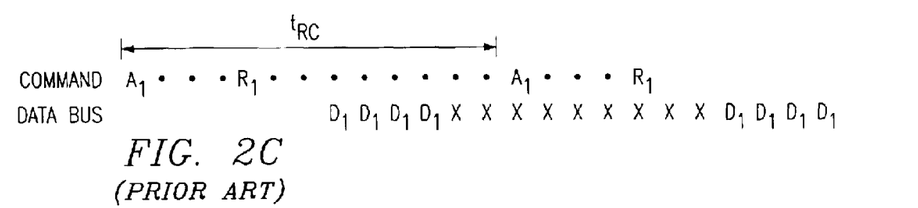

FIGS. 2A–2C depicts how interleaving affects the data bus. Assume $t_{RC}$ is 13 cycles, the burst length is 4 cycles, $A_X$ is an activate command for bank X, $R_X$ is a read command for bank X, and $D_X$ is data from bank X. FIG. 2A depicts an example of interleaving using 3 banks of the 4 banks of the arrangement shown in FIG. 1A. As shown, the data bus is used for 12 cycles out of 13 cycles. FIG. 2B depicts an example of interleaving using 2 banks of the 4 banks of the arrangement shown in FIG. 1A. As shown, the data bus is used for 8 cycles out of 13 cycles, which is ⅔ of the efficiency of the arrangement of FIG. 2A. Since RAS cycle time ($t_{RC}$) has not completed for the first bank after R2 has been issued, the subsequent access for the first bank must wait until the RAS cycle time has completed. This additional wait time decreases the data bus usage. FIG. 2C depicts an example of interleaving using 1 banks of the 4 banks of the arrangement shown in FIG. 1A. As shown, the data bus is used for 4 cycles out of 13 cycles, which is ⅓ of the efficiency of the arrangement of FIG. 2A. Since only one bank is being used, the pre-charge must complete for each access before the next access can begin. Another way to view the efficiencies of the interleaving examples is to assume that using three banks provides an bandwidth efficiency of B (FIG. 2A), then using two banks provides 2B/3 (FIG. 2B), and using one bank provides 1B/3 (FIG. 2C).

The memory commands are sent via the address/command bus 108, and typically comprise 4 additional bits that are provided along with the address. The command bits typically comprise write enable (WE), RAS, column address strobe (CAS), and chip select (CS). For example, A1 (activate command) of FIG. 2A is sent along with the row/bank address, and R1 (read command) is sent along with the column/bank address. Thus, for a read (or write) operation, two separate commands are used, namely, an activate with the row address followed by a read/write with the column address.

A first prior art manner that is used to accomplish interleaving, is to reorder the memory accesses such that different banks are used for consecutive accesses. A plurality of memory accesses are queued or buffered in memory controller 110. The accesses are then issued from the buffer in a different order so that different banks are used for consecutive memory accesses. This manner has several problems. Namely, this manner works well for random address mappings, however, this manner does not work well when the addresses in the accesses have a constant stride, because the reordering buffer will not contain any addresses which break the stride pattern. Constant stride addresses tend to map to one or two banks. Thus, a series of access requests to a four bank memory having addresses of 0, 4, 8, ... (stride of 4) will map to the same bank, and a series of access requests with addresses 0, 2, 4, 6, ... (stride of 2) will map to two banks. So no matter how accesses are buffered, only 1 or 2 banks would be used. As shown above, sequential accesses to one bank or two banks have efficiencies of 1B/3 or 2B/3, respectively. Note that this typically would not occur continuously through out an entire program, but rather would occur in certain spots in the program execution.

A second manner that the prior art uses to accomplish interleaving is to interleave across the low-order bits of the address of the request; For example, using the 4 bank example above, the two least-significant bits of the address would be used to select the bank. Thus, 00 would access Bank 0, 01 would access Bank 1, 10 would access Bank 2, and 11 would access Bank 3. Again, this manner works well for random addresses or addresses with strides of 1, but does not work well for addresses with strides of $2^N$, e.g. 2 or 4. A stride of 1 will interleave across all four banks. A stride of 2 will result in interleaving across two banks of the 4 bank above example, e.g. addresses of 0, 2, 4, 6, 8, ... will interleave across the first bank (0, 4, 8 will map to Bank 0), and third bank (2, 6, will map to Bank 2). A stride of 4 will interleave across one bank, e.g. addresses of 0, 4, 8, ... will interleave across the first bank, Bank 0. The average bandwidth for this manner with the 4 bank example is (B+⅔B+B+⅓B)/4, which equals 3B/4, and the worst case bandwidth is ⅓B. Note that the average bandwidth is calculated from the four possible stride bandwidths, namely stride of 1 (B), stride of 2 (2B/3), stride of 3 (B), and stride of 4 (1B/3). This manner is further explained in "Fourth Technique for Higher Bandwidth: Avoiding Memory Bank Conflicts", in Computer Architecture: a Quantitative Approach, $2^{nd}$ edition, Hennessy & Patterson 1996, Chapter 5 Memory Hierarchy Design, pp. 435–437, which is hereby incorporated herein by reference.

A third manner that the prior art uses to accomplish interleaving is to use a prime number of banks, with each bank having $2^X$ rows and columns. The mapping of addresses to banks is done by calculating address mod banks; that is, the remainder after dividing the address by the number of banks. For example with three banks, 6 mod 3=0, 7 mod 3=1, 8 mod 3=2, and 9 mod 3=0, etc. Thus, strides of 1 or 2 will have sequential accesses directed different banks, but strides of 3 will cause accesses to be directed to the same bank. Note that strides of n behave the same as strides of n mod 3, so for example strides of 4 behave like strides of 4 mod 3=1. Thus, only the bandwidth of strides 1, 2, and 3 need to be calculated to calculate the bandwidth of the three-bank system over all possible strides. The average bandwidth for the prime number manner with a three bank system is (B+B+1B/3)/3=7B/9, with the worst case being 1B/3 for a stride of 3. This manner is further explained in "The Chinese Remainder Theorem and the Prime Memory System", by Gao, $20^{th}$ Annual Int'l Symposium on Computer Architecture ISCA '20, San Diego, May 16–19, 1993, which is hereby incorporated herein by reference. A problem with this manner is that memory systems are not available in prime numbers. Memory systems, e.g. SDRAM, are usually only available in banks of $2^N$. Thus, a system using this manner would not use a portion of memory, e.g. one bank if there are four banks, or three banks if there are 16 banks, since the closest prime to 16 is 13.

Note that the above discussion of bandwidth is for a maximum bandwidth that can be achieved for a continuous stream of memory access requests at a constant stride. Actual realized bandwidths would typically be less than the maximum bandwidth because actual memory access patterns are typically more complex than a continuous, constant stride, e.g. different strides for different lengths of time or even no strides.

BRIEF SUMMARY OF THE INVENTION

One embodiment of the invention is a memory controller that maps a received address to a memory location in a plurality of memory banks, the memory controller comprising: circuitry for calculating a remainder from a division of the received address by a divisor, wherein the divisor is based on the number of the plurality of banks; circuitry for determining a particular bank of the plurality of banks based on the remainder and at least one bit of the received address; and circuitry for determining the memory location in the particular bank using at least a portion of the received address.

Another embodiment of the invention is a method for mapping an address to a particular bank of a plurality of memory banks, the method comprising: receiving the address; dividing the address by a divisor, wherein the divisor is based on the number of the plurality of memory banks; and determining the particular bank based on a remainder of the step of dividing and at least one bit of the address.

Another embodiment of the invention is a system for mapping an address to a particular bank of a plurality of memory banks comprising: means for dividing the address by a divisor, wherein the divisor is based on the number of the plurality of memory banks and forming a remainder; and means for determining the particular bank based on the remainder and at least one bit of the address.

Another embodiment of the invention is a computer system comprising: a plurality of memory banks; a memory controller that receives a memory access request that includes an address and maps the address to a particular location in the plurality of memory banks based on at least one bit of the address and a remainder of the address divided by a number associated with the number of the plurality of memory banks; and circuitry for accessing the particular location using at least a portion of the received address.

BRIEF DESCRIPTION OF THE DRAWINGS

For a more complete understanding of the present invention, reference is now made to the following descriptions taken in conjunction with the accompanying drawing, in which:

FIG. 7 depicts an example of an embodiment of the invention with a 16 bank memory system.

DETAILED DESCRIPTION

Embodiments of the invention map a memory address, e.g. a physical address, to a memory system that preferably comprises $2^N$ banks, each preferably having $2^P$ memory locations such that most consecutive addresses will be mapped to different banks. Consecutive addresses means with respect to the same stride, e.g. if the stride is 1, then consecutive addresses would be 0, 1, 2, 3, 4, etc., if the stride is 2, then consecutive addresses would be 0, 2, 4, 6, 8, etc. Embodiments of the invention are preferably implemented using combinational circuitry that allows the embodiments to perform the mapping in less than one clock cycle. This will keep the memory latency low. Embodiments of the invention are operative for many different strides without bank conflicts, and thus provide high memory bandwidth on the data bus. Embodiments of the invention do not require a prime number of memory banks, and thus will operate with commercially available memory systems and use all of the available memory.

Note that in various implementations, the least significant bits of the address are not used to access memory. To simplify the explanation of the embodiments of the present invention, all bits of the address are used to access main memory. However, those skilled in the art will recognize that some of the least significant bits may not be needed to address main memory since they specify bytes within the cache line. For further information, see U.S. Pat. No. 6,405,286 entitled "METHOD AND APPARATUS FOR DETERMINING INTERLEAVING SCHEMES IN A COMPUTER SYSTEM THAT SUPPORTS MULTIPLE INTERLEAVING SCHEMES," issues on Jun. 11, 2002, and U.S. Pat. No. 6,070,227 entitled "MAIN MEMORY BANK INDEXING SCHEME THAT OPTIMIZES CONSECUTIVE PAGE HITS BY LINKING MAIN MEMORY BANK ADDRESS ORGANIZATION TO CACHE MEMORY ADDRESS ORGANIZATION," issued on May 30, 2000, the disclosures of which are hereby incorporated herein by reference.

Figure 3:
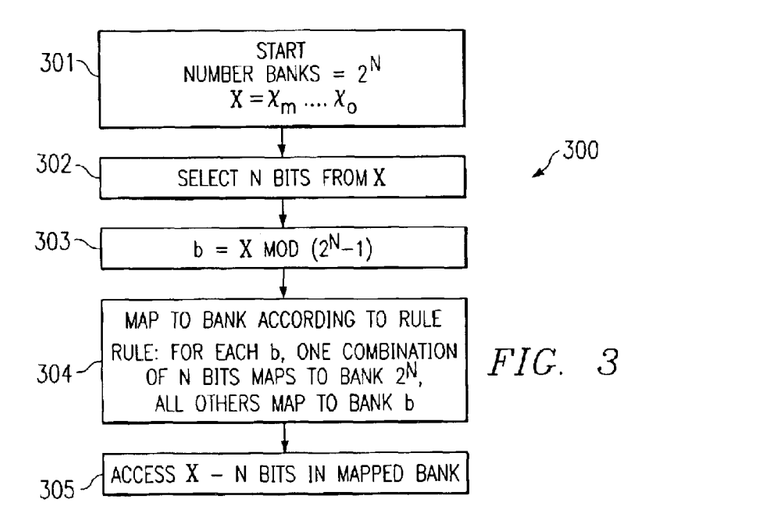
FIG. 3 is an example of a flow diagram of an embodiment of the present invention.

A preferred implementation 300 for the operation of an embodiment of the invention is shown in FIG. 3. The system comprises $2^N$ banks of SDRAM memory and uses bit stream X to address memory locations within the system, wherein X comprises $x_m \ldots x_0$. The operation starts 301 when a memory access request is received that includes a memory address X. An embodiment of the invention reads N bits, where N is the N in $2^N$ banks from the bit stream, 302. These N bits are preferably known as the interleave bits. The locations in the bit stream are predetermined, and are preferably the least significant bits. However, other bits may be used. Moreover, the N bits may be sequentially located in the stream or may be distant from each other. The N bits may be low order bits or may be high order bits, or some low order and some high order bits. The embodiment of the invention then determines modulus b 303, which is the remainder of X when divided by $2^N-1$, which is expressed as $b=X \bmod 2^N-1$. This operation may be performed in parallel with, before, or after box 302. The N bits and b are then used to determine which bank the address X will be mapped to 304. The general rule preferably is that for each b, one combination of N bits maps to bank $2^N$ (or a designated bank), and all of the other combinations map to bank b. The memory location (row and column address) identified by X, without the N bits, can then be accessed 305 for a read, write, or other memory operation. Note that the modulus is $(x_m 2^m + \ldots x_0 2^0) \bmod 2^N-1$ for binary numbers.

Figure 4A:
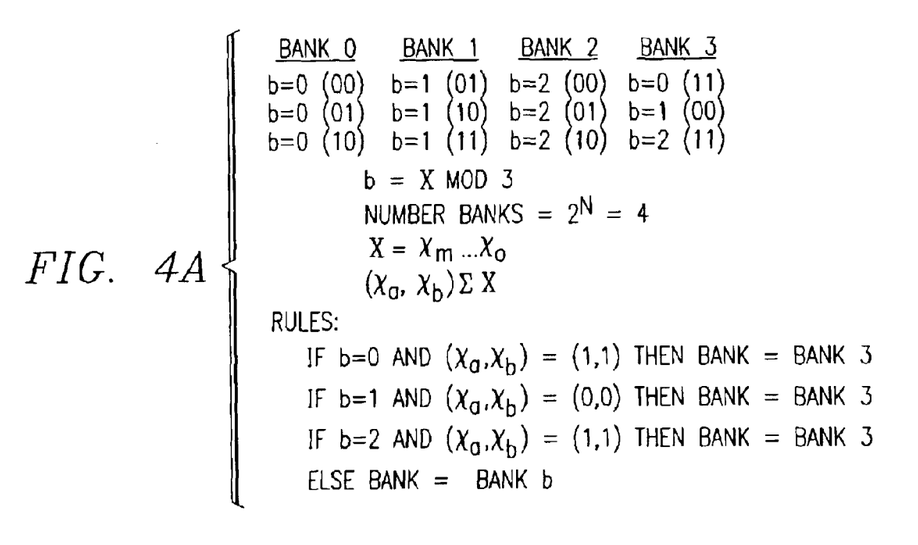
FIGS. 4A–4C depict an example of an embodiment of the invention with a 4 bank memory system.

An example of an implementation of the embodiment of the invention of FIG. 3 is shown in FIG. 4A. This example assumes that the memory system has 4 banks, namely Bank 0, Bank 1, Bank 2, and Bank 3. Note that the number of banks is by way of example only, as a different number of banks could be used. Thus, N=2 and b=X mod 3. b will then have a range of possible values of 0, 1, and 2. Bits $x_a$ and $x_b$ of X are used as the interleave bits. The rules used to map address X are: 1) if b=0 and $(x_a\, x_b)=(11)$ then the bank is Bank 3; 2) if b=1 and $(x_a\, x_b)=(00)$ then the bank is Bank 3; 3) if b=2 and $(x_a\, x_b)=(11)$ then the bank is Bank 3; 4) else bank=Bank b. Note that these rules are by way of example only, as other rules could be used. For example, instead of Bank 3 receiving b=0,1,2 special cases of interleave bits, a different Bank could be used, e.g. Bank 0, and thus rule 4 would then read else bank=Bank b+1. Note that there are a total of 12 different cases or combinations of b and interleave bits, and that each Bank would be mapped to for 3 different cases.

Figure 4B:
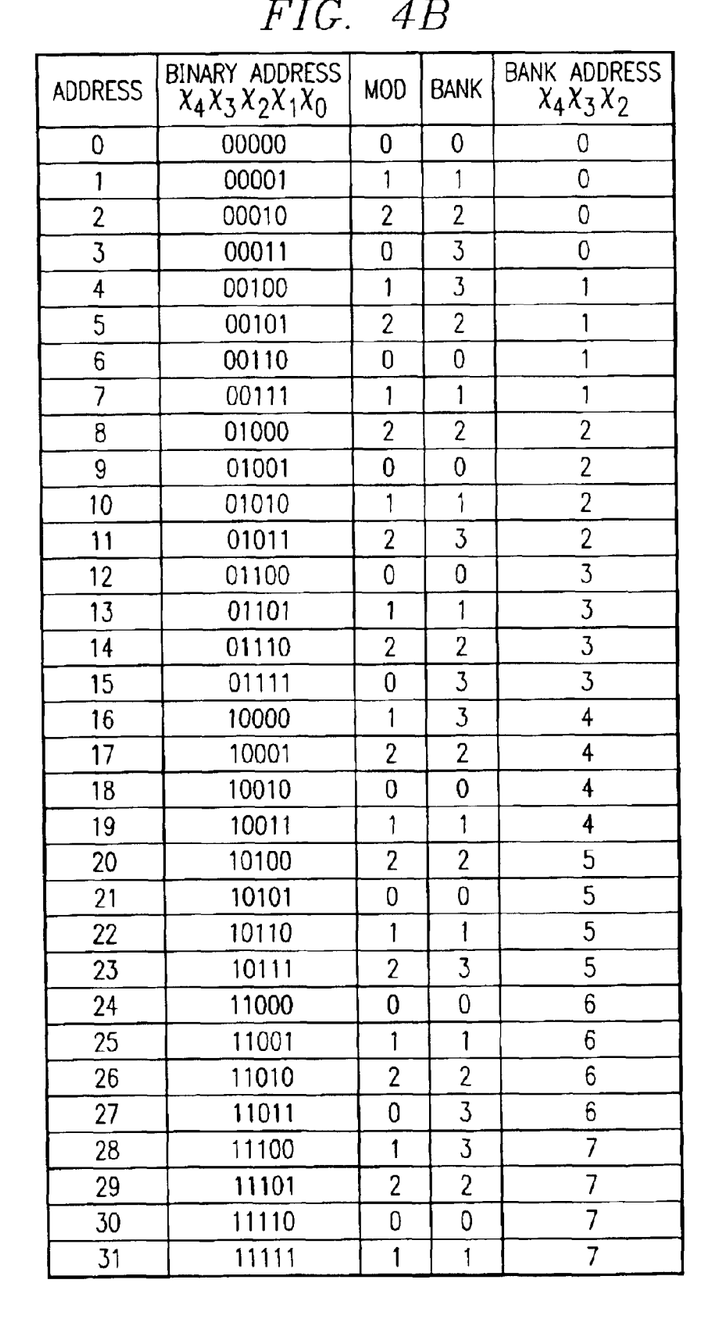
Figure 4C:
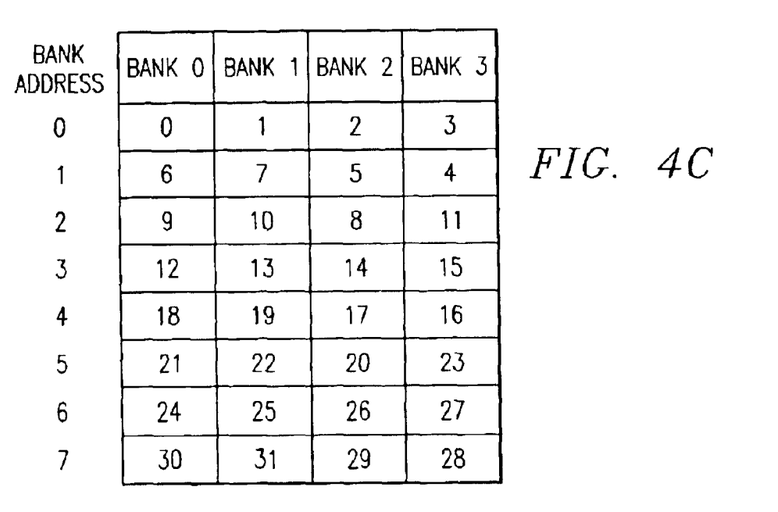

FIG. 4B depicts how the example of FIG. 4A would operate with four banks of memory that comprise a total of 32 memory locations. The number of locations is by way of example only, as more or fewer locations could exist. Typically, a memory system comprises thousands of memory locations. Thus, the memory addresses are X=31, 30, . . . 1, 0, which corresponds to binary addresses of 11111, 11110, . . . 00001, 00000. Note that each binary address corresponds to $x_4\, x_3\, x_2\, x_1\, x_0$. The interleave bits are selected to be $x_1\, x_0$, which are selected by way of example only as other bits could be used, e.g. $x_3\, x_1$. Thus, the remaining bits of X, namely $x_4\, x_3\, x_2$ are used for the memory location address with in each bank. FIG. 4C depicts a layout of the example of FIG. 4B. Note that each bank has bank addresses from 7 (111) to 0 (000), and that the bits $x_4\, x_3\, x_2$ are used to determine that bank address within each bank. Further note that the address within the bank is depicted as a single column having a plurality of rows for the sake of simplicity. Since actual memory banks are composed of arrays of rows and columns and have thousands of locations, the address bits would have both row and column information.

Referring to FIGS. 2A–2C, if the stride uses 3 banks then there is a bandwidth of B; if the stride uses 2 banks then the bandwidth is 2B/3, and if the stride uses 1 bank then the bandwidth is B/3. For examples shown in FIGS. 2A–2C, B would equal 12/13. In FIG. 2A, the cycles up to D1 on the data bus can be ignored since this is the time to the first transfer. The data is then transferred for 12 of the next 13 cycles, and thus the bandwidth is 12/13. Similarly, the bandwidth for the stream of FIG. 2B is 8/13 (which is 2B/3), and for the stream of FIG. 2C is 4/13 (which is B/3). Thus, using 3 or 4 banks, maximum (or near maximum, 12/13) can be achieved. Using these results in the example of FIGS. 4A–4C, strides of 1 map to 4 banks, strides of 2 map to 3 banks, strides of 3 map to 2 banks, and one quarter of the strides of 4 (e.g. 3, 5, 11, 15, 19, 23) map to 2 banks. The remaining strides of 4 map to 3 banks. Thus, the average bandwidth for the example shown in FIGS. 4A–4C for strides of 1 to 4 is (B+B+2B/3+(1/4*2B/3+3B/4))/4=43B/48=0.896B, with the worse case being 2B/3. Note that these calculations assume some re-ordering, e.g. using a buffer of 4 locations. This re-ordering is necessary to reduce the chance of random consecutive accesses from going to the same bank. As exemplified with the streams shown in FIGS. 2A–2C, it is better to rotate accesses through 3 or 4 different banks rather than 1 or 2 banks.

A further explanation on the bandwidth of FIG. 4C follows. A stride of 1 can be mapped to three banks, with a small reordering buffer. For example, consider the address stream of 0, 1, 2, 3, 4, 5, 6. Using the mapping of FIG. 4C, the memory controller would map 0, 1, 2, 3 to banks 0, 1, 2, 3, with no reordering. But then address 4 would map to bank 3, and bank 3 is busy. Thus, address 4 is buffered and the next address is considered, address 5, which is also busy (for purposes of this example, assume that the busy banks are the two most recently written to banks). Thus, address 5 is buffered and the next address is considered, address 6, which is mapped to bank 0, which is not busy. Now bank 2 is no longer busy, so address 5 is then sent to bank 2. Next, bank 3 is no longer busy, so address 4 is then sent to bank 3. Thus, the received order is 0, 1, 2, 3, 4, 5, 6 and the sent order is 0, 1, 2, 3, 6, 5, 4 which corresponds to banks 0, 1, 2, 3, 0, 2, 3. Since at least 3 banks are being used, the bandwidth is B for strides of 1.

Assume a stream that has a stride of 2, for example the stream of addresses 0, 2, 4, 6, 8, 10. This would map to banks 0, 2, 3, 0, 2, 1, without reordering. Since at least 3 banks are being used, the bandwidth is B for strides of 2.

Assume a stream that has a stride of 3, for example the stream of addresses 0, 3, 6, 9, 12, 15, 18, 21, 24, 27, etc. These would directly map to banks 0, 3, 0, 0, 0, 3, 0, 0, 0, 3. With the reordering buffer, the addresses would be issued in the following order 0, 3, 6, 15, 9, 27, 12, etc., which would correspond to banks 0, 3, 0, 3, 0, 3, 0, 3. Since 2 banks are being used, the bandwidth is 2/3B for strides of 3, similar to the bandwidth of the stream of FIG. 2B. Note that the amount of time that the pattern can be reordered depends on the depth of the reordering buffer. In this example, a depth of three would be needed, e.g. to store 18, 21, and 24. Further note that constant strides typically do not last long.

Assume a stream that has a stride of 4, for example the stream of addresses 0, 4, 8, 12 map to banks 0, 3, 2, 0, which is three bank mapping. However, a worst case stride 4 stream would be address sequence 3, 7, 11, 15, 19, 23, for example. This stream would map to banks 3, 1, 3, 3, 1, 3. Since 2 banks are being used, the worst case bandwidth is 2/3B for strides of 4.

Note that the discussions of bandwidths for the embodiments of the invention are for a maximum bandwidth that can be achieved for a continuous stream of memory access requests at a constant stride. Actual realized bandwidths using the embodiments of the invention would typically be less than the maximum bandwidth, because actual memory access patterns are typically more complex than a continuous, constant stride, e.g. different strides for different lengths of time or even no strides.

Figure 5A:
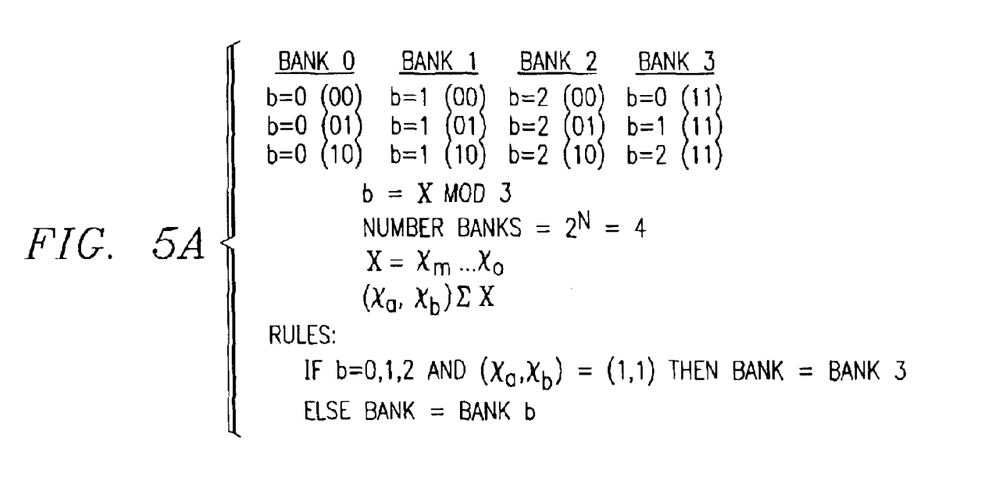
FIGS. 5A–5C depict an alternative embodiment of the invention of FIGS. 4A–4C.
Figure 5B:
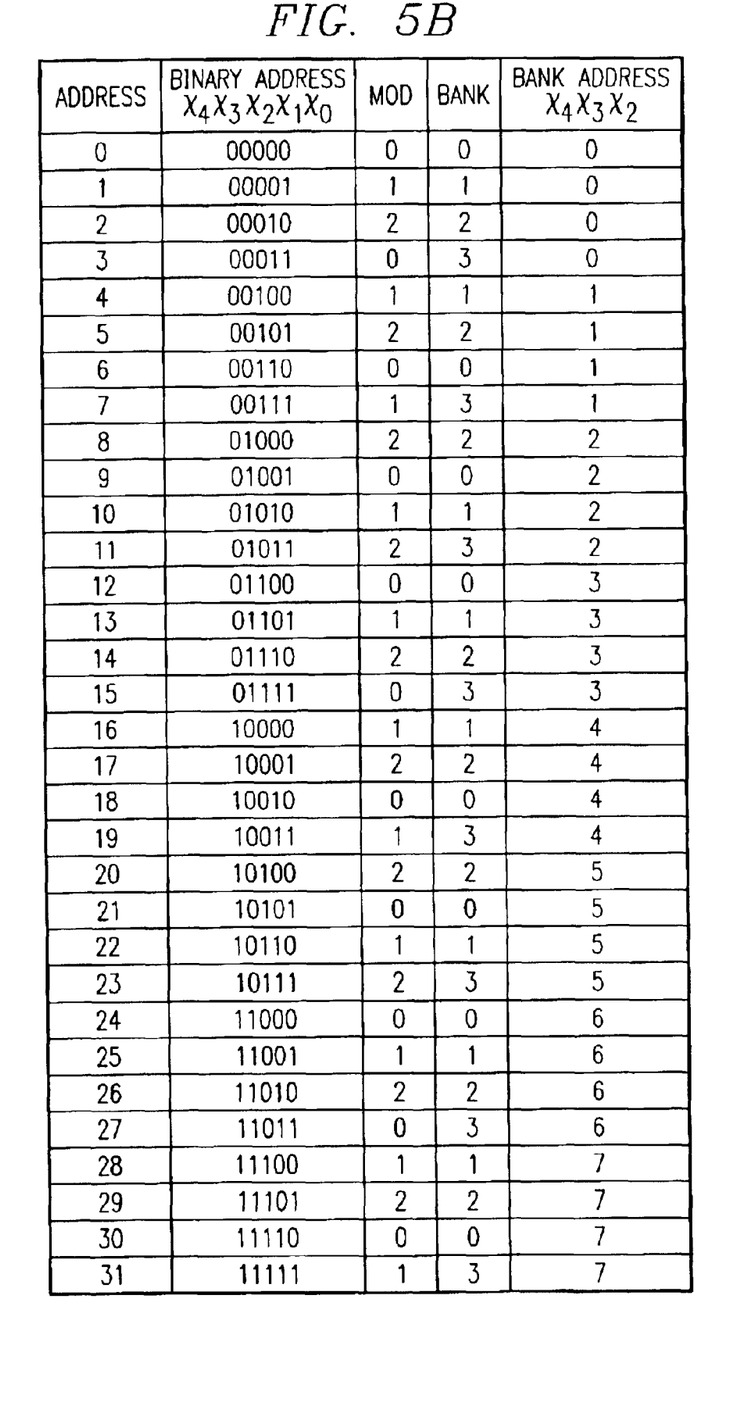
Figure 5C:
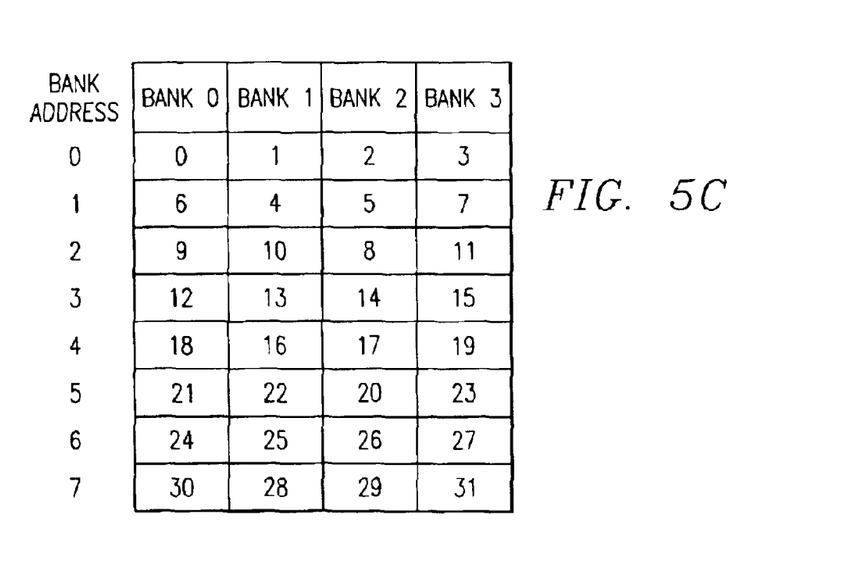

FIG. 5A depicts an example of an embodiment of the invention that is similar to that of FIG. 4A, and has rules that are slightly different that those of FIG. 4A. Note that the rules used to map address X are: 1) if b=0, 1, or 2 and ($x_a$ $x_b$)=(11) then the bank is Bank 3; and 2) else bank=Bank b. As shown in FIGS. 5B and 5C, this change results in a different mapping from those shown in FIGS. 4B and 4C. Although this is a legal mapping, the bandwidth is not as high as that of FIGS. 4A–4C. For the mapping of FIGS. 5A–5C, the bandwidth for strides of 1 to 4 is: ((B+B+2B/3+(1/4*B/3+3/4*B))/4=42/48=0.875 B, with the worst case performance being 1/3 B for stride 4 address sequence 3, 7, 11, 15, 19, 23, 27, 31, as this will map to the single bank 3. However, this mapping has a higher bandwidth than the prior art. The bandwidth for strides 1 to 4 for the LSB interleaving of FIG. 1B is: B for stride 1 (since stride 1 uses all four banks), 2B/3 for stride 2 (since stride 2 uses two banks, c. g. 0, 2, 4, 6, 8 will use banks 0 and 2, B for stride 3 (since stride 3 uses all four banks with reordering), and B/3 for stride 4 (since stride 4 uses only one bank). Thus, the average is ((B+2B/3+B+B/3))/4=3/4B=0.75 B, with a worst-case of B/3.

Note that the rules shown in FIGS. 4A and 5A are by way of example only, as other rules could be used. Further note that the address within the bank is depicted as a single column having a plurality of rows for the sake of simplicity. Since actual memory banks are composed of arrays of rows and columns and have thousands of locations, the address bits would have both row and column information.

Figure 6:
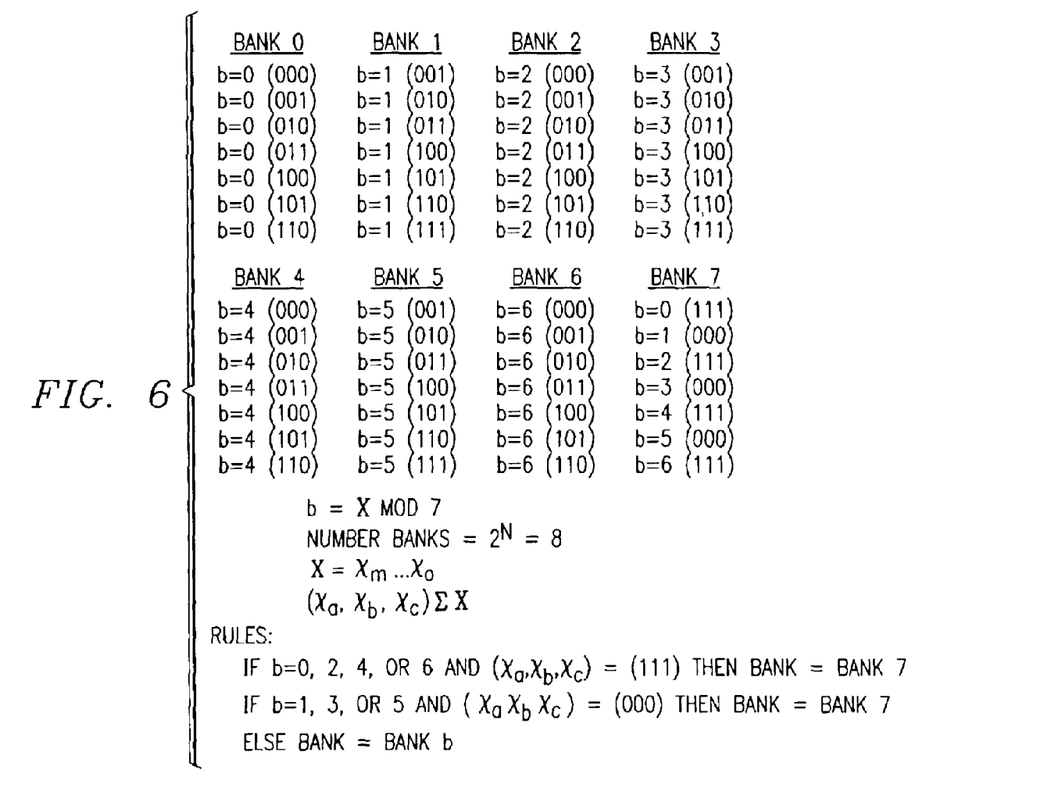
FIG. 6 depicts an example of an embodiment of the invention with a 8 bank memory system.

As stated earlier, embodiments of the invention can operate on memory systems with different numbers of banks, e.g. other than four. An example of an implementation of an embodiment of the invention with 8 banks of memory is shown in FIG. 6, namely Bank 0, Bank 1, Bank 2, Bank 3, Bank 4, Bank 5, Bank 6, and Bank 7. Thus, N=3 and b=X mod 7. b will then have a range of possible values of 0 to 6. Bits $x_a$ $x_b$ $x_c$ of X are used as the interleave bits. The rules used to map address X are: 1) if b=0, 2, 4, or 6 and ($x_a$ $x_b$ $x_c$)=(111) then the bank is Bank 7; 2) if b=1, 3, or 5 and ($x_a$ $x_b$ $x_c$)=(000) then the bank is Bank 7; and 3) else bank=Bank b. Note that there are a total of 56 different cases or combinations of b and interleave bits, and that each Bank would be mapped to for 7 different cases. The mapping of addresses to banks for FIG. 6 is:

| b0 | b1 | b2 | b3 | b4 | b5 | b6 | b7 |
|----|----|----|----|----|----|----|----|
| 0  | 1  | 2  | 3  | 4  | 5  | 6  | 7  |
| 14 | 15 | 9  | 10 | 11 | 12 | 13 | 8  |
| 21 | 22 | 16 | 17 | 18 | 19 | 20 | 23 |
| 28 | 29 | 30 | 31 | 25 | 26 | 27 | 24 |
| 35 | 36 | 37 | 38 | 32 | 33 | 34 | 39 |
| 42 | 43 | 44 | 45 | 46 | 47 | 41 | 40 |
| 49 | 50 | 51 | 52 | 53 | 54 | 48 | 55 |
| 56 | 57 | 58 | 59 | 60 | 61 | 62 | 63 |
| 70 | 71 | 65 | 66 | 67 | 68 | 69 | 64 |

For all strides 1 to 8, the addresses are distributed over more than two banks. For stride 7, there are 7 consecutive access to the same bank. For example, address sequence 14, 21, 28, 35, 42, 49, 56 all maps to bank 0. Although the next address in the sequence (63) maps to a different bank, the following seven addresses in the sequence map to bank 0 again. Using the conservative assumption that the bandwidth for sequences of stride 7 is B/3, the average bandwidth over the first 8 strides is (7*B+B/3)/8=91.7%.

FIG. 7 depicts an example of an implementation of an embodiment of the invention with 16 banks of memory. In this example, N=4 and b=X mod 15. b will then have a range of possible values of 0 to 14. Bits $x_a$ $x_b$ $x_c$ $x_d$ of X are used as the interleave bits. The rules used to map address X are: 1) if b=0 ... 13 or 14 and ($x_a$ $x_b$ $x_c$ $x_d$)=(1111) then the bank is Bank 15; and else bank=Bank b. Note that there are a total of 240 different cases or combinations of b and interleave bits, and that each Bank would be mapped to for 15 different cases.

Note that with the example shown in FIG. 7, 15 (N=4) is not a prime number, but rather is a composite number having divisors of 3 and 5. Most low value numbers of $2^N-1$ are prime numbers, for example 3 (N=2), 7 (N=3), 31 (N=5), and 127 (N=7) are prime numbers. However, 63 (N=6) is also not a prime number, but is a composite number having divisors of 21, 9, 7 and 3. Similarly, 255 (N=8), 511 (N=9), 1023 (N=10), 2047 (N=11, where 23·89=2047), and 4095 (N=12) are not prime numbers. 8191 (N=13) is a prime number. The first 26 prime numbers are 2, 3, 5, 7, 11, 13, 17, 19, 23, 29, 31, 37, 41, 43, 47, 53, 59, 61, 67, 71, 73, 70, 83, 89, 97, 101. The larger numbers are currently not important for two reasons. The first is that current standard memories typically use 4 or 8 banks. The second is that for N greater than 3, it is currently difficult to perform the translation within a clock cycle.

Figure 8:
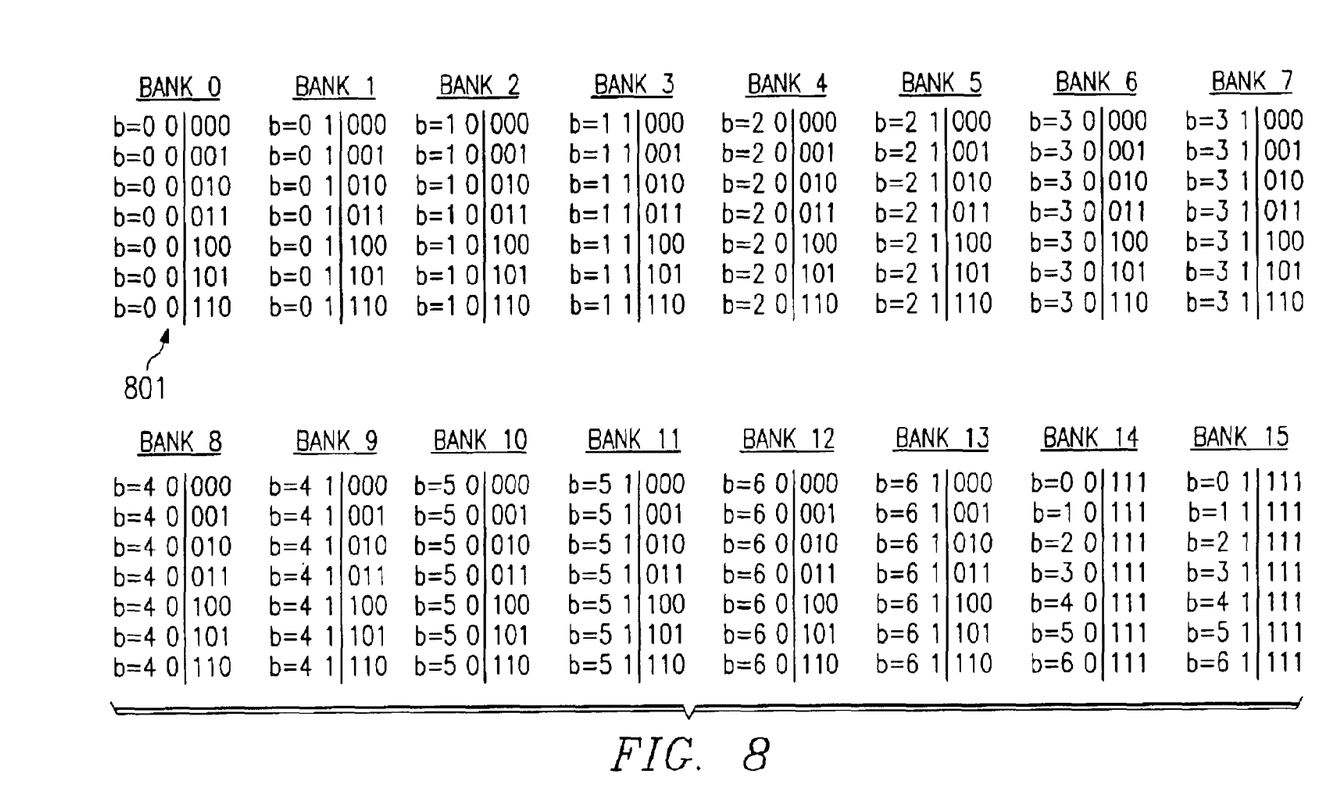
FIG. 8 depicts an example of a different embodiment of the invention with a 16 bank memory system.

The divisor in the mod equation is preferably a prime number, e.g. 3 or 7. Otherwise bank conflicts will occur at strides that are equal to the factors, as well as, multiples of the factors. Thus, for 15, bank conflicts will occur with strides of 3, 5, as well as 6, 9, 12, etc. (multiples of 3) and 10, 15, etc. (multiples of 5). This will reduce the performance of the embodiment of the invention to that of the arrangement of FIG. 1B. If this is not acceptable, then the banks can be grouped together to form a smaller number of 'larger' banks. In other words, 16 banks can be grouped together in pairs to form 8 equal-sized larger banks, for example. This would reduce the number of banks to a level such that $2^N-1$ is prime, i.e. n=3 or mod 7. This reduction will also work to reduce any of the other non-prime numbers to prime numbers. Additional bits could then be used to select a particular smaller bank within each larger bank. An example of this arrangement is shown in FIG. 8. Note that banks 0&1, 2&3, 4&5, 6&7, 8&9, 10&11, 12&13, and 14&15 have been paired together such that the same modulus, b, applies to both banks in the pair. The first bit 801 in the bit sequence is used to select between the banks within the pair of banks. Alternatively, the banks can be divided in two groups of 8 banks, and a bit could be used to select between the two groups. Note that 16 may also be divided into four groups of four, and use two bits to detect between them, c. g. where n=2 or mod 3.

Figure 9:
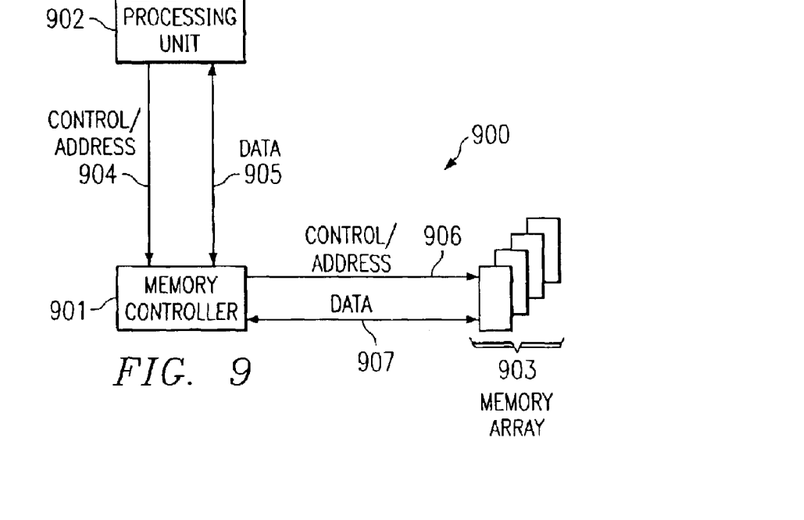
FIG. 9 depicts an example of a memory controller using an embodiment of the invention.

FIG. 9 depicts an example of a memory controller 901 that has an embodiment of the invention. The memory controller 901 receives memory access requests from a processor unit 902 via command bus 904. Note that computer system 900 may include more that one processor unit. The memory access request includes address and control information. The control information may specify that the access request is for a read operation, write operation, a combination thereof, or other memory function. If the access involves writing data to the memory 903, the processor may also send data on data bus 905. The memory controller 901 maps the address in the request to a memory location within the SDRAM memory banks 903, in accordance with the embodiments of the invention as described above and depicted in FIGS. 3–8. The memory controller forwards the control information and the mapped address to the memory banks 903 via command bus 906, and if there is data for a write operation, then the data is provided to the memory banks 903 via data bus 907. The memory banks 903 then process the control information at the memory location specified by the mapped memory location. If the access involves a read operation, then data is read from the mapped memory location, and provided back to the processing unit 902, via data bus 907, controller 901, and data bus 905. If there is only one processing unit, the data bus 907 may directly couple to the processing unit 902. In a multiple processing unit system, the memory controller (or another structure) will control the flow of the data back to the requesting processing unit. Note that the memory controller 901 can be part of the processor unit 902, rather than a separate unit as shown in the FIG. 9.

Figure 10:
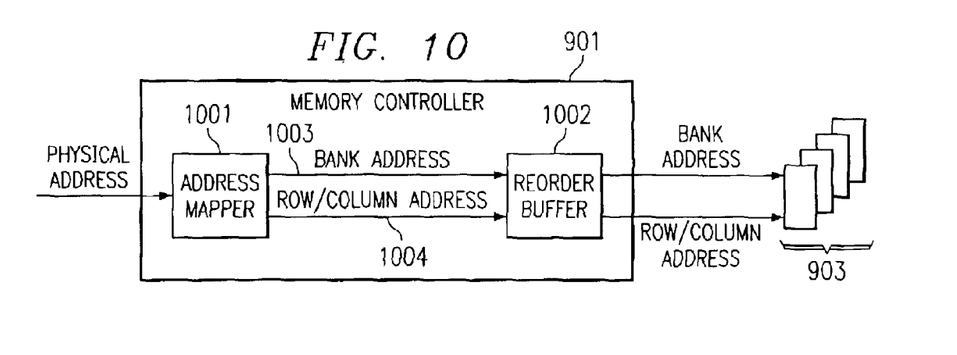
FIG. 10 depicts an example of the memory controller of FIG. 9.

FIG. 10 depicts an example of an arrangement of the memory controller 901 of FIG. 9. The memory controller has address mapper 1001, which receives the address, e.g. a physical address, and maps the physical address to the memory banks 903. The address mapper 1001 provides a bank address 1003 and a memory location address 1004, which may be expressed as a row/column address. The memory controller preferably includes a reorder buffer 1002 for address information that conflicts with another pending memory access request. The reorder buffer reduces bandwidth loss that would occur from random consecutive accesses to the same bank of from short bursts of strides that map to the same bank. Once the conflict is cleared, then the address information is released or issued to the memory banks.

Figure 11A:
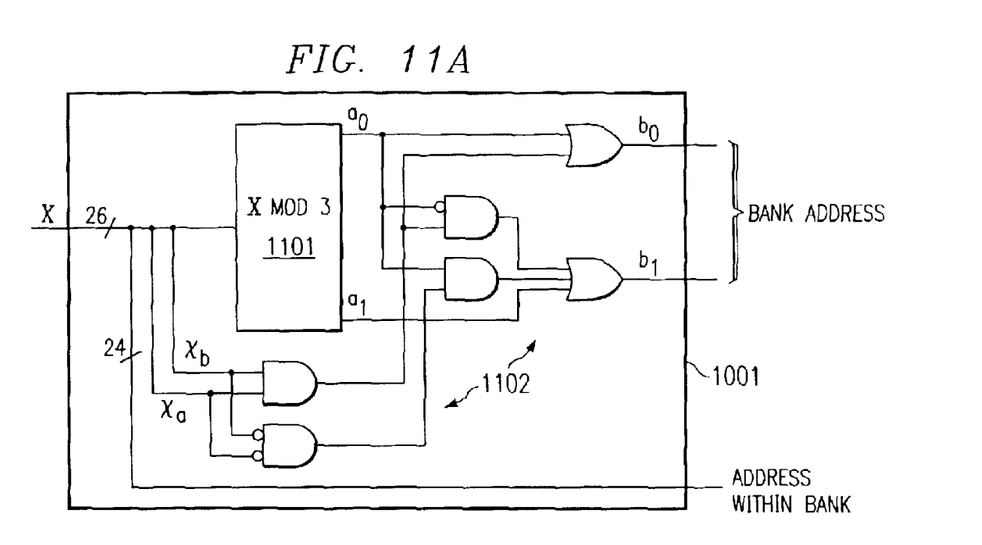
FIGS. 11A–11B depict an example of an address mapper that is in the memory controller of FIG. 10.
Figure 11B:
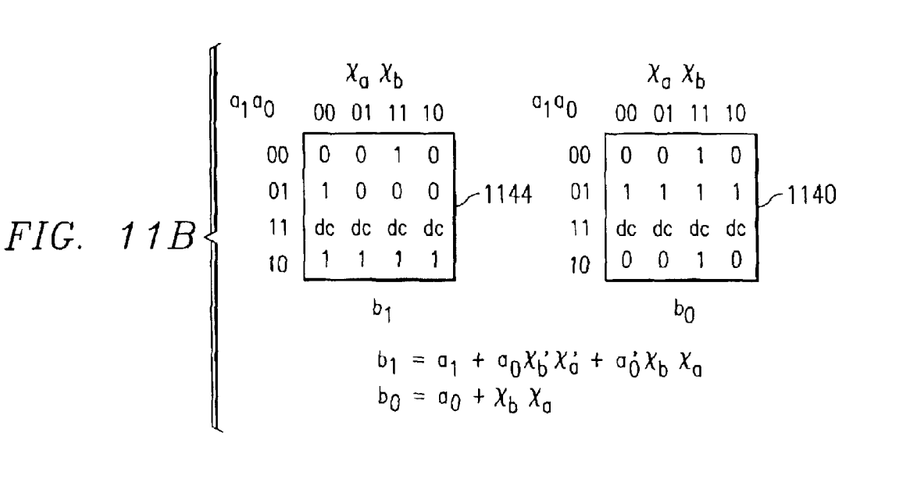

FIG. 11A depicts an example of an arrangement of the address mapper 1001 of FIG. 10. The address mapper 1001 includes logic or circuitry 1101 for performing the modulus function on the address X, and logic or circuitry 1102 for determining the bank address based on the results of circuitry 1101 and a portion of address X. The address mapper 1001 forms the memory location address, which is the location address within the bank, from the address X. The memory location address may be in the form of a row/column address. FIG. 11B are the tables depicting the outputs of circuit 1102. The circuit 1102 is set to operate according to the rules provided in FIG. 4A. The rows of $a_1a_0$=00, 01, and 10 correspond to remainders of 0, 1, and 2, respectively. Thus, if b=0, which means that $a_1a_0$=00, and bits $x_ax_b$=11, then bank 3 will be selected, thus, the outputs $b_0b_1$=11, which corresponds to 3. Note that this circuit is by way of example only, as other circuits could be used to form the same rule as that shown in FIG. 11B or different rules.

Note that it is known prior art that X mod n is easier to calculate when $n=2^m-1$ for non powers of $2^n$. Block 1101 calculates X mod n, where $n=2^m-1$, for example n=3. Note that 1) $2^0$ mod 3=1, $2^1$ mod 3=2, $2^2$ mod 3=1, $2^3$ mod 3=2, etc. Note that 2) $X=x0*2^0+x1*2^1+x2*2^2+\ldots xp*2^P$. Note that (a+b) mod c=(a mod c)+(b mod c), so from 2) and 3) X mod $n=(x0*2^0$ mod n)+$(x1*2^1$ mod n)+$(x2*2^2$ mod n)+ . . . $(xp*2^P$ mod n) which from 1) equals: X mod 3=((x)+x2+x4+. . . )*1+(x1+x3+x5+ . . . )*2) mod 3. Suppose X has 32 bits, x0 to x31. Then, from the previous equation: X mod n=A+B mod 3, where A is a number from 0 to 16, and B ix an even number up to 32. So X mod 3=C mod n, where C ranges from 0 to 48, and C=x0+x2+ . . . +x30+2*(x1+x3+ . . . x31). The number 0 to 48 takes only 6 binary digits to represent, c0 to c5, so we can repeat the same procedure on C: X mod 3=c0+c2+c4) mod 3+(c1+c3+c5)*2 mod 3. This can be calculated directly in hardware.

Note that there is no row of data for $a_1a_0$=11, which corresponds to a remainder of 3, as the remainder will range from 0–2 in that example. Further note that because $a_1a_0$=11 is not a legal output of block 1101, then these entries in the table can be used as don't cares (dc) to reduce the equations for b0 and b1 in FIG. 11B. The equations shown correspond to selecting all 1's for b1 and b0 in these don't care rows.

Embodiments of the invention have been described above in terms of SDRAM memory. However, other embodiments of the invention may operate with DRAM memory, RAM memory, ROM memory, DDR memory, RAMBUS memory, cache memory, or any other type of memory, that is organized into blocks or banks.

Embodiments of the invention have also been described above in terms of memory. However, other embodiments of the invention-may also operate with any other device that is organized into blocks. For example, in large scale computers systems, an arbitrator can use embodiments of the invention in dividing up tasks among the different processing units, and thus reduce latency and increase bandwidth in the system.

Embodiments of the invention are preferably implemented as logic and/or circuitry that is formed into a chip and is designed to perform the elements of the embodiments of the invention described herein. However, other embodiments of the invention may also be implemented in software. When implemented in software, the elements of the embodiments of the invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Internet, etc.

What is claimed is:

1. A memory controller that maps a received address to a memory location in a plurality of memory banks, the memory controller comprising:
   circuitry for calculating a remainder from a division of the received address by a divisor, wherein the divisor is based on the number of the plurality of banks;
   circuitry for determining a particular bank of the plurality of banks based on the remainder and at least one bit of the received address; and
   circuitry for determining the memory location in the particular bank using at least a portion of the received address.

2. The memory controller of claim 1, wherein the divisor is equal to the number of the plurality of banks minus one.

3. The memory controller of claim 1, wherein the divisor is a prime number.

4. The memory controller of claim 1, wherein the number of memory banks is equal to $2^N$ and the at least one bit of the received address is equal to N bits.

5. The memory controller of claim 4, wherein $2^N-1$ is a non-prime number, wherein the memory controller further comprises:
   circuitry for grouping the plurality of memory banks into $2^M$ groups wherein $2^M-1$ is a prime number.

6. The memory controller of claim 5, wherein the divisor is $2^M-1$ and the at least one bit of the received address is equal to M+1 bits.

7. The memory controller of claim 1, wherein the number of memory banks is equal to four, the divisor is equal to three, and the at least one bit is equal to 2 bits.

8. The memory controller of claim 1, wherein the portion of the received address is exclusive of the at least one bit of the received address.

9. The memory controller of claim 1, wherein the received address is a physical address associated with a memory access request.

10. The memory controller of claim 1, further comprising:
    a reorder buffer;
    wherein the reorder buffer holds at least one memory access request that is associated with the received address and conflicts with another memory access request that maps to the particular bank.

11. The memory controller of claim 1, further comprising:
    logic for accessing the memory location to allow processing of a memory access request associated with the received address.

12. The memory controller of claim 1, wherein the plurality of memory banks are a portion of a DRAM memory system.

13. The memory controller of claim 1, wherein a maximum realizable bandwidth of the memory controller is greater than 0.75B, wherein B is a maximum usage of a data bus of the memory banks.

14. A method for mapping an address to a particular bank of a plurality of memory banks, the method comprising:
    receiving the address;
    dividing the address by a divisor, wherein the divisor is based on the number of the plurality of memory banks; and
    determining the particular bank based on a remainder of the step of dividing and at least one bit of the address.

15. The method of claim 14, further comprising:
    determining a memory location in the particular bank using at least a portion of the address.

16. The method of claim 14, wherein the divisor is equal to the number of the plurality of banks minus one.

17. The method of claim 14, wherein the divisor is a prime number.

18. The method of claim 14, wherein the number of memory banks is equal to $2^N$ and the at least one bit of the received address is equal to N bits.

19. The method of claim 18, wherein $2^N-1$ is a non-prime number, wherein the method further comprises:
    grouping the plurality of memory banks into $2^M$ groups, wherein $2^M-1$ is a prime number.

20. The method of claim 19, wherein the divisor is $2^M-1$ and the at least one bit of the address is equal to M+1 bits.

21. The method of claim 14, wherein the portion of the address is exclusive of the at least one bit of the address.

22. The method of claim 14, further comprising:
    holding at least one memory access request that is associated with the address and conflicts with another memory access request that maps to the particular bank.

23. The method of claim 14, further comprising:
    accessing the memory location to allow processing of a memory access request associated with the received address.

24. A system for mapping an address to a particular bank of a plurality of memory banks comprising:
    means for dividing the address by a divisor, wherein the divisor is based on the number of the plurality of memory banks and forming a remainder; and
    means for determining the particular bank based on the remainder and at least one bit of the address.

25. A computer system comprising:
    a plurality of memory banks;
    a memory controller that receives a memory access request that includes an address and maps the address to a particular location in the plurality of memory banks based on at least one bit of the address and a remainder of the address divided by a number associated with the number of the plurality of memory banks; and
    circuitry for accessing the particular location using at least a portion of the received address.

* * * * *